Aug. 4, 1959
A. G. PERKINS
2,897,779
PIPE LINING APPARATUS
Filed June 6, 1958
2 Sheets-Sheet 1
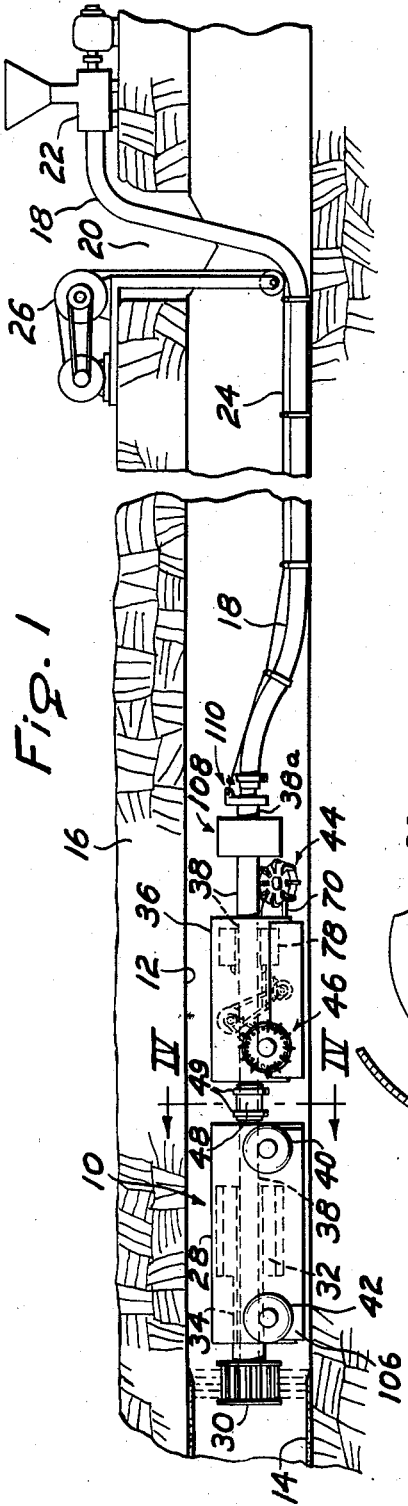
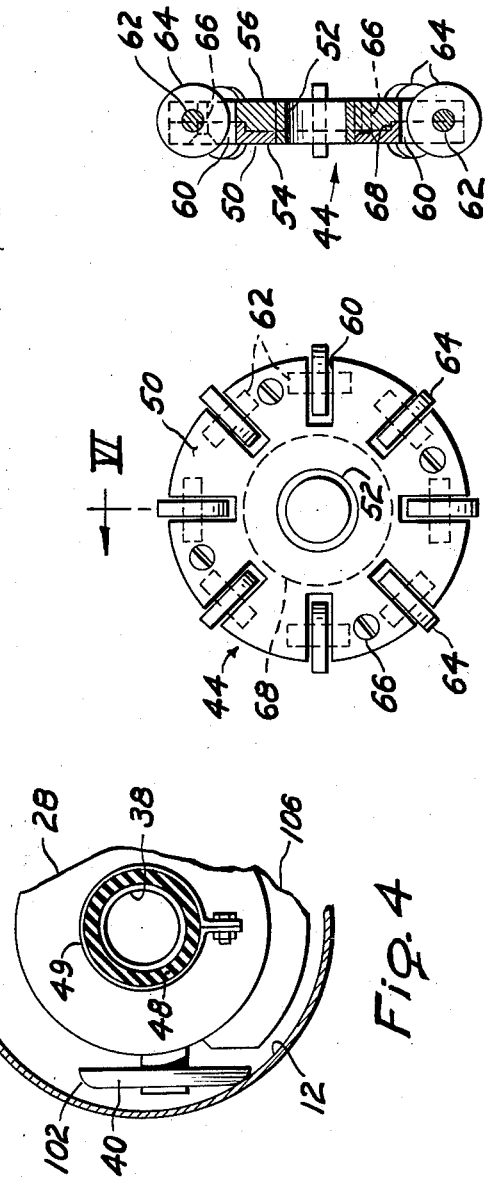
INVENTOR.
Albert G. Perkins
BY
Bean, Brooks, Buckley & Bean Aug. 4, 1959
A. G. PERKINS
2,897,779
PIPE LINING APPARATUS
Filed June 6, 1958
2 Sheets-Sheet 2
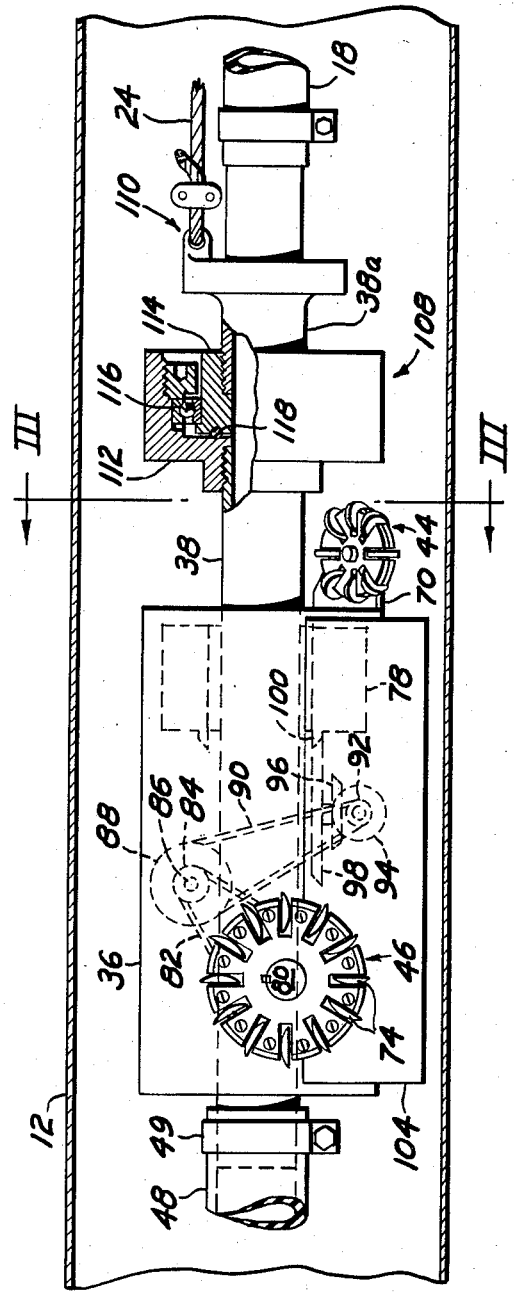
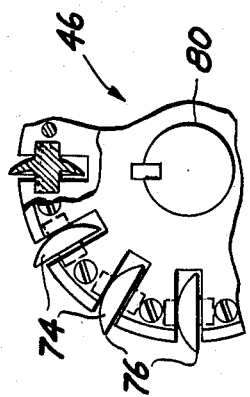
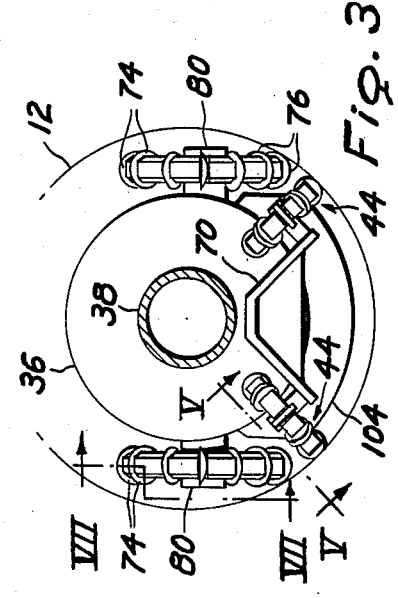
INVENTOR.
Albert G. Perkins
BY
Bean, Brooke Buckley & Bean United States Patent Office 2,897,779
Patented Aug. 4, 1959

2,897,779

PIPE LINING APPARATUS

Albert G. Perkins, Grand Island, N.Y., assignor to Perkins Pipe Linings, Inc., Grand Island, N.Y.

Application June 6, 1958, Serial No. 740,471

10 Claims. (Cl. 118—306)

This invention relates generally to apparatus for applying a protective coating of mortar or like material to the inner walls of pipe lines, conduits and the like, and more particularly to apparatus for providing such a lining to pipes of relatively small diameter.

Apparatus of this general class is shown and described in U.S. Patent No. 2,758,352 granted to Alfred J. Perkins August 14, 1956, and includes a pipe lining machine adapted to travel through a pipe in the ground while applying a lining thereto, usually by means of a centrifugal distributor head on the trailing end of the machine. Such a machine ordinarily includes means for powering the distributor head and for controlling the rate of advance of the machine through the pipe, and takes its supply of mortar or other pipe lining material from a flexible hose or conduit connected to the forward end of the machine and extending through the pipe in advance of the machine, through a manhole or other opening, and thence to an above-ground source of the lining material.

It is desirable to maintain such a machine in an upright position as it travels through the pipe, and since in the lining of small diameter pipes no direct, personal supervision is possible, it is necessary that such means be automatic and reliable in operation. In the case of machines for larger diameter pipes, it has been in the past customary to provide some sort of steering action whereby the carriage of the machine has been guided along the bottom of the pipe being lined, usually by providing the machine with a carriage of a tricycle form wherein the third or center wheel of the tricycle arrangement swivels to perform the steering function.

In machines for pipes of very small diameter, however, it has been found that, because of the confined quarters and proportionately greater length of the machine, a conventional steering action is often impracticable, particularly where the machine nearly fills the pipe and therefore must be substantially coaxial therewith at all times. Furthermore, the relatively sharp curvature of the wall of a small diameter pipe often renders the use of an ordinary, free trailing type swivel impracticable. This is particularly true where apparatus, such as a forwardly extending mortar supply hose and/or a machine propelling draw cable may exert an off-center pull on the machine, for example, as the apparatus rounds a bend in the pipe being lined.

In accordance with the present invention, means are provided whereby correction of the attitude of the machine is brought about in a simple and automatic manner, the apparatus provided preferably being such as constantly to urge the machine to assume a desired upright position and to permit it to slip in a rotational manner along its long axis in order to yield readily to this attitude rectifying urge, with the apparatus including means freeing the machine from undesired twisting or restraining forces such as might arise, for example, from the lining material supply hose attached to and extending in advance of the machine.

In the preferred apparatus, the pipe lining machine is given a low center of gravity to provide the desired upright position seeking urge, and, to permit free response to that urge, the carriage wheels of the machine are provided with sidewise slipping characteristics and the connection to the mortar supply hose and/or the draw cable or the like is made through a rotary coupling. Desirably, the carriage wheels at the forward portion of the machine are given the greatest sidewise slipping characteristic so that, to the degree that the pipe being lined may afford some lateral clearance to enable a steering action, it will be the forward portion of the machine which will tend to slide to the bottom of the pipe first, with the rest of the machine thereupon being urged to follow, train-fashion. In the preferred construction, the wheels supporting the forward portion each comprise a body rotatably mounted on a fixed axis transverse of the pipe, and the treading surface of each of these wheels comprises a plurality of rollers mounted in the periphery of the wheel body on axes at right angles to the main axis of the wheel body. Accordingly, the main axes rotation of the wheel bodies may be fixed and rigid while at the same time full freedom for sidewise, i.e. attitude shifting, motion of this portion of the carriage is accommodated. This provides smooth, easy operation of this portion of the machine carriage, and facilitates use of a pair of such wheels angularly related at the forward end of the machine, as distinguished from prior art single caster arrangements, for maintaining the desired at least approximately coaxial position of the machine within the pipe in a firm manner.

The roller treaded wheels of the invention may have, in effect, a lugged periphery, and lend themselves well to use for traction duty where desired; the rollers may have sharp, directionally set treading edges for this purpose. The location of these wheels at the forward end of the machine frees the trailing, distributor head end of the machine from any resultant vibration and preferably this isolation is augmented by use of a plural sectioned machine with resilient coupling means between the forward, roller wheel carriaged part and the trailing, distributor head bearing part.

Accordingly, a major object of the invention is to provide a pipe lining apparatus wherein the pipe lining machine is provided with improved means for maintaining the machine in a desired upright position as it travels through the pipe being lined.

Another object of the invention is to provide a pipe lining apparatus as aforesaid wherein the machine is provided with automatic upright attitude-seeking characteristics, and with means enabling restoration of the machine to an upright position effectively free of restraint from friction with the pipe and twisting motions of connected portions of the apparatus.

Still another object of the invention is to provide a pipe lining apparatus having improved machine carriage wheels adapted to facilitate attitude-readjusting motions of the machine while providing a firm treading action maintaining the machine substantially coaxial with the pipe.

Another object of the invention is to provide in apparatus as aforesaid an improved wheel means having a fixed axis of rotation together with tread means providing anti-friction characteristics with respect to motion transverse of the tread.

Yet another object of the invention is to provide improved wheel means as aforesaid having high friction characteristics in a direction longitudinal of the tread, enabling use of the wheel as a traction element.

Yet another object of the invention is to provide improved apparatus as aforesaid including improved wheel means as aforesaid together with means isolating the lining material dispensing part of the machine from vibration arising at the wheel means.

Other objects of the invention will be apparent from the foregoing general discussion, the following detailed description, the claims, and from the drawings wherein:

Fig. 1 is a fragmentary general view, partly in section, showing pipe lining apparatus in accordance with the invention, in use;

Fig. 2 is a fragmentary portion of Fig. 1 drawn to an enlarged scale and showing parts broken away;

Fig. 3 is a sectional view taken about along line III—III of Fig. 2;

Fig. 4 is a fragmentary sectional view taken along about line IV—IV of Fig. 1, drawn to the scale of Figs. 2 and 3;

Fig. 5 is an enlarged detail view of one of the wheels of the apparatus of Fig. 1, taken about along V—V of Fig. 3;

Fig. 6 is a sectional view taken about along line VI—VI of Fig. 5; and

Fig. 7 is an enlarged partially sectioned fragmentary view taken about along line VII—VII of Fig. 3.

Referring more particularly to the drawings, the apparatus illustrated in Fig. 1, embodying a preferred form of the invention, is of the type which comprises a pipe lining machine 10 adapted to travel through a pipe 12 while applying a lining 14 of mortar or other suitable material to the interior thereof, without removal of the pipe from the ground 16. The machine 10 is supplied with lining material through a flexible conduit or hose line 18 leading from the machine through the pipe 12, through an excavation 20 or other suitable entrance to the pipe line, and to an exterior pump 22 or other suitable source of lining material, the hose line 18 being propelled in advance of the machine by a draw cable 24 detachably connected to the hose line 18 at intervals therealong and drawn or windlassed toward the excavation 20 by a suitable winch device 26 or the like. The machine itself comprises a lining applicator section 28 having a rotary distributor head 30 and housing motor means 32 connected to the distributor head 30 by a hollow shaft 34 for powering the distributor head, and a separate machine travel control section 36. A feed conduit 38 forming part of the machine passes through the two machine sections 28, 36. Thus it will be understood that lining material passes from the pump 22, through the hose line 18 and the feed conduit 38 to the distributor head 30 where the material is thrown or sprayed by the centrifugal force action of the distributor head rotor, in the general manner shown in the aforesaid U. S. Patent No. 2,758,352.

Features of the present invention find perhaps their greatest utility and cooperation in an arrangement such as illustrated herein wherein the two machine sections 28, 36 are provided by separate carriages, in other words, where the applicator machine section 28 is a full trailer, and wherein the motion control section 36 is of a passive or non-motorized traction type with the motive power for propelling the machine along the pipe coming from the draw cable 18. Accordingly, in the illustrated machine, each section 28, 36 has fore and aft pairs of wheels 40, 42 and 44, 46, and the two machine sections thus separately carriaged are connected by a flexible coupling provided by a resilient or other flexible material hose section 48 interposed in the feed conduit 38 between the two machine sections, as by means of clamps 49, 49 attaching the ends of the hose section to the portions of the feed conduit 38 carried by the respective machine sections.

As shown in greater detail in Figs. 2–7, the carriage wheels 44, 46 of the forward portion of the machine are of a special roller treaded construction, embodying important features of the invention. In the preferred arrangement shown, the foremost or leading pair of wheels 44 each comprise a wheel body 50 carrying a suitable bearing part 52 press fitted or otherwise fixed thereto for mounting the body rotatably on an axis transverse thereto. The wheel body 50 is formed in two complementarily shaped plate like sections 54, 56 notched about their peripheries to provide radial slots 60. Adjacent the opposite sides of each slot 60 the plates are complementarily grooved to receive and to provide a bearing for the opposite end portions of axles 62 mounting roller shaped tread members 64. As shown, the rollers 64 are press fitted or otherwise fixedly mounted on the corresponding axles 62 for being rotatable with the axles and maintained thereby free of contact with the slots 60; alternatively the axles could be clamped tightly in the wheel body grooves mounting the same and the rollers 64 could be freely rotatable on the axles. In either case it is desirable that the rotation of the rollers on their axes, which axes are transverse to the main axis of rotation of the wheel body 50, be of a free, anti-friction character. As shown, the two wheel sections 54, 56 are held in assembled relation by screws 66 and are shaped with interfitting shoulders 68 to provide a strong load bearing structure.

Since the forward end of the machine is the part thereof ordinarily subjected to the greatest lateral forces, it is preferred that the foremost wheels 44 be mounted on angularly related axes so that their bodies rotate in planes which are radial of the pipe 12, angularly related to extend in downwardly and outwardly directions, as best seen in Fig. 3. As shown in that figure the wheels are mounted in this manner by a bracket 70 fixed to the forward end of the housing of the machine travel control section 36 and carrying short stub axles upon which the wheels 44 are journaled. Mounted as shown, these leading or pilot wheels 44 are in position to support the forward end of the machine in the pipe 12 and to maintain it coaxial therewith against lateral forces in an optimum manner.

As aforesaid, the motion control apparatus of the illustrated machine 10 is of a passive traction means type, that is, with the entire power for propelling the machine through the pipe 12 coming from the winch 26 and transmitted therefrom to the machine through the draw cable 24, and with the machine holding back or resisting overspeed operation such as would otherwise be occasioned by jerking motions of a long draw cable and attached supply hose. Roller treaded wheels of the invention are well suited to use as traction elements in this kind of speed control. In the construction shown, the second pair of wheels 46 of the forward or travel control section 36 of the machine are employed as speed control traction elements. As shown, the construction of the traction wheels 46 is similar to that of the pilot wheels 44 already described. However it is preferred that the peripheral or tread forming rollers 74 of the traction wheels have sharp, high traction treading edges 76, and be shaped as shown in Fig. 7 to provide these edges 76 with a set in opposition to the pull of the cable 24. Accordingly the traction wheels 46 have high traction in directions longitudinal of the machine and particularly in opposition to the cable, while retaining the roller provided anti-friction characteristic as to sidewise or rotary motions of the machine about its longitudinal axis, for attitude correction.

One form of passive traction apparatus is indicated schematically in Fig. 2 to comprise, for example, a fly wheel 78 coupled to the traction wheels 46 by a transmission comprising a sprocket (not shown) mounted on the axle shaft 80 of each of the traction wheels 46 and connected by chains 82 to sprockets 84 on a counter shaft 86 which drives a sprocket 88 connected by a chain 90 to a sprocket 92, which is connected through a pair of small bevel gears 94, 96 to a large bevel gear 98 which drives a ring gear 100 attached to the fly wheel. Thus the transmission provides a speed increase resulting in considerable energy storage in the fly wheel even though the traction wheels 46 turn, as is quite usual, at a slow speed.

When the draw cable 24 tends to jerk, as is a common problem, energy is thus stored in the fly wheel to prevent uneven motion of the machine, and the torque at the wheels 46 is of course considerable. The tread elements 74 of the invention provide the needed traction for this kind of opeartion while retaining lateral anti-friction properties, as aforesaid.

The carriage wheels 40, 42 of the trailing, lining applicator section 28 of the machine are also provided with treads having low friction to sidewise motion, although it is not regarded as necessary or desirable that this friction be as low as that of the anti-friction treads of the more forwardly positioned wheels 44, 46. Accordingly treads of the wheels 40, 42 are not fitted with rollers, but are made smooth and hard, for example, from smoothly machined metal, and are radiused as shown at 102 to slide sideways easily on the interior surface of the pipe 12. Thus the trailing section wheels 40, 42 will slide sideways in response to machine attitude rectifying forces, but preferably somewhat less easily than the forward section wheels 44, 46 so that to the extent that clearances in the pipe 12 permit any steering action, the trailing section 28 will be constrained to follow the motion of the leading section 36, train-fashion.

Any suitable means may be provided for supplying the upright attitude seeking urge to which the several low friction carriage wheels 44, 46 and 40, 42 respond for restoration of the desired position of the machine in the pipe; in the illustrated arrangement this urge is supplied by providing the machine sections 36, 28 with low centers of gravity, as by provision of heavy ballast weights 104, 106 attached to the bottoms of the frames of the two machine sections. The provision of the weight 104 on the advance section insures a desired piloting action, and the other weight 106 is located proximate to the distributor head 30 in position to overcome directly the reaction torque of the motor 32.

For freeing the machine from rotary forces or restraints such as might otherwise be derived from the hose line 18 and the draw cable 24 it is preferred that the machine be connected to these elements through a rotary coupling 108. In the construction shown the coupling 108 mounts the leading or connector bearing end 38a of the feed pipe 38 in a rotationally free manner, the outlet end of the hose line 18 being clamped to the rotationally free conduit section 38a as shown and the draw cable 24 also being anchored on this section, as indicated at 110.

Any suitable rotary coupling structure may be employed, the coupling structure 108 illustrated comprising a bell portion 112 mounted on the feed conduit 38 and an inner portion 114 mounted rotationally therein by anti-friction means 116 and sealed thereto by an O ring 118. Thus the coupling is capable of transmitting the strong pull of the cable 24 through the bearing 116 to the machine and provides a fluid seal at 118 while maintaining freedom of relative rotation between the machine 10 and the parts of the apparatus connected thereto through the conduit portion 38a.

From the foregoing it will be appreciated that the invention provides simple, rugged and automatic upright position maintaining means for a pipe lining machine in an apparatus of the general kind described. The foremost or pilot wheels 44 of the machine are equipped and disposed to bear strong lateral forces such as may derive from the draw cable 24 of the hose 18 as the machine rounds bends in the pipe line 12, and the traction wheels 46 have the high friction necessary for operation of passive traction means as exemplified by the fly wheel arrangement indicated schematically, all without loss of the desired lateral anti-friction properties. The remaining carriage wheels 40, 42 of the machine are not called upon to withstand as large loads and therefore may be of simpler construction as shown, which has the additional advantage, as aforesaid, of providing the desired train-like following characteristic where clearances enable any degree of steering action. Additionally, the use of a segmented type machine with the sections thereof separately carriaged and interconnected by the, in effect, double universal jointed coupling 48, frees the distributor head bearing portion of the machine from any vibration arising from the, in effect, lugged wheels 44, 46 on the advance section.

While only one form of the invention has been shown and described in detail it will be understood that the invention may be otherwise embodied within the spirit of the invention and the scope of the appended claims.

What is claimed is:

1. In a pipe lining apparatus, a lining applicator machine adapted to travel through a pipe to be lined, lining material supply means comprising a flexible conduit line extending from said machine to a remote source of lining material and means adapted to propel said conduit line in advance of said machine, and rotary coupling means connecting the leading end of said machine to said conduit line and being adapted substantially to free said machine of torque from said conduit line, said machine having a low center of gravity and comprising carriage means adapted to support said machine in the pipe while permitting said machine to shift rotationally about its longitudinal axis in response to gravity, said carriage means comprising a pair of wheels mounted on said machine at opposite sides of said leading end thereof, said wheels comprising wheel bodies rotatably mounted on fixed axes angularly related to dispose the rotational planes of said wheel bodies outwardly and downwardly radially of said pipe, each of said wheels comprising tread means comprising a plurality of roller means disposed about the periphery of the wheel body and rotatably mounted therein on axes transverse to the rotational axis of the wheel body.

2. In a pipe lining applicator machine adapted to travel through a pipe to be lined, carriage means adapted to support said machine in the pipe comprising wheels mounted on said machine, said wheels each comprising a rotatably mounted wheel body and tread means comprising a plurality of roller means disposed about the periphery of the wheel body and rotatably mounted therein on axes transverse to the rotational axis of the wheel body.

3. In a pipe lining applicator machine adapted to travel through a pipe to be lined, carriage means adapted to support said machine in the pipe comprising a pair of wheel means mounted on said machine at opposite sides thereof in position to bear outwardly and downwardly against the pipe wall to give vertical and lateral support to said machine, each of said wheel means comprising tread means rotatably connected to said machine through first and second transversely related axes to impart universal rolling action to said tread means longitudinally and transversely of the pipe surface.

4. In a pipe lining applicator machine adapted to travel through a pipe to be lined, machine travel control traction means including traction wheel means adapted to tread upon the inner wall of the pipe, said wheel means comprising a rotatably mounted wheel body and tread means comprising a plurality of roller means disposed about the periphery of the wheel body and rotatably mounted therein on axes transverse to the rotational axis of the wheel body, said roller means having sharp annular traction edges oriented transverse of the tread.

5. In a pipe lining applicator machine adapted to travel through a pipe to be lined, machine travel control traction means including traction wheel means adapted to tread upon the inner wall of the pipe, said wheel means comprising a rotatably mounted wheel body and tread means comprising a plurality of roller means disposed about the periphery of the wheel body and rotatably mounted therein on axes transverse to the rotational axis of the wheel body, said roller means having sharp annular traction edges oriented transverse of the tread and having a set in a given direction longitudinal of the tread for providing increased traction against skidding of the tread in that direction.

6. In a pipe lining apparatus including a lining applicator machine adapted to travel through a pipe to be lined, machine propulsion means comprising draw cable means attached to the leading end of the machine and extending therefrom in advance thereof and traction mechanism means on the machine active for opposing the pull of said draw cable means, and means operative to support and control the attitude of said machine in said pipe comprising wheel means on the machine arranged to tread on the interior wall of the pipe, said wheel means comprising a pair of wheels mounted at opposite sides of said leading end of said machine and a traction wheel operatively associated with said traction mechanism, each of said wheels comprising a wheel body and tread means comprising a plurality of roller means disposed about the periphery of the wheel body and rotatably mounted therein on axes transverse to the rotational axis of the wheel body, said wheel bodies of said pair of wheels being rotatably mounted on fixed axes angularly related to dispose their rotational planes outwardly and downwardly radially of said pipe, and said roller means of said traction wheel comprising tread surface means having a high friction characteristic active in the direction opposite to the pull of said draw cable means.

7. In a pipe lining apparatus including a lining applicator machine having powered rotary distributor head means, said machine being adapted to travel through a pipe to be lined, and lining material supply means comprising a flexible conduit line extending from said machine to a remote source of lining material and means adapted to propel said conduit line in advance of said machine, means for maintaining said machine in an upright attitude despite reaction torque of the distributor head means and twisting of said conduit line, comprising rotary coupling means connecting said machine to said conduit line, means on the machine adapted to apply force to said machine urging the same to adopt an upright attitude, and carriage means on said machine adapted to support said machine in the pipe while permitting said machine to respond to said force, said carriage means comprising a wheel body rotatably mounted on a fixed axis on said machine, and tread means mounted by said wheel body and disposed thereby to bear on the pipe wall, said tread means comprising a plurality of tread surface forming roller means disposed in a series longitudinal of the tread and rotatable on axes transverse to the rotational axis of said wheel body.

8. In a pipe lining applicator machine adapted to travel through a pipe to be lined, wheel means adapted to tread on the pipe wall, comprising a wheel body rotatably mounted on said machine, and tread means comprising a plurality of roller means disposed about the periphery of the wheel body and rotatably mounted therein on axes transverse to the rotational axis of the wheel body.

9. In a pipe lining apparatus, a lining applicator machine adapted to travel through a pipe to be lined in a predetermined direction while applying a lining thereto, said machine comprising means adapted to apply force to the forward portion thereof directed to urge said forward portion to assume an upright attitude in said pipe, and carriage means adapted to support said machine in the pipe while permitting said machine to respond to said force, said carriage means comprising first and second wheel means mounted on said machine at fore and aft positions thereon, respectively, and each comprising at least a pair of wheels rotatably mounted on fixed axes on said machine, the wheels of said first wheel means each having tread means comprising a plurality of roller means disposed about the periphery of the corresponding wheel body and rotatably mounted therein on axes transverse to the rotataional axis of said wheel body, and the wheels of said second wheel means each comprising tread means having a smooth hard treading surface fixed on the corresponding wheel body, whereby said first wheel means respond more readily to said force than said second wheel means and each wheel means provides positive and stable support.

10. In a pipe lining apparatus, a lining applicator machine adapted to travel through a pipe to be lined, said machine comprising at least a leading section and a separate trailing section and a resilient connection therebetween, said trailing section comprising rotary distributor head means adapted to distribute lining material to the pipe wall centrifgually, and separate carriage means for each of the two sections adapted to support the same in the pipe independently, said carriage means of said leading section comprising a wheel body rotatably mounted on a fixed axis thereon and tread means comprising a plurality of roller means disposed about the periphery of the wheel body and rotatably mounted therein on axes transverse to the rotational axis of the wheel body, said resilient connection being adapted to isolate the distributor head from vibration arising at said tread means.

References Cited in the file of this patent

UNITED STATES PATENTS

| | | |
|---|---|---|
| 1,081,497 | Goetz | Dec. 16, 1913 |
| 1,860,385 | Crapo | May 31, 1932 |
| 2,461,517 | Carnevale | Feb. 15, 1949 |
| 2,704,873 | Kirwan et al. | Mar. 29, 1955 |
| 2,758,352 | Perkins | Aug. 14, 1956 |